(12) United States Patent
MacGaffey

(10) Patent No.: US 11,226,759 B2
(45) Date of Patent: Jan. 18, 2022

(54) REPLICATED DATA CACHE WITH ANCHORED LIFE-CYCLE

(71) Applicant: MetaFluent, LLC, Warrenville, IL (US)

(72) Inventor: Andrew MacGaffey, Carol Stream, IL (US)

(73) Assignee: METAFLUENT, LLC, Warrenville, IL (US)

(*) Notice: Subject to any disclaimer, the term of this patent is extended or adjusted under 35 U.S.C. 154(b) by 0 days.

(21) Appl. No.: 16/906,570

(22) Filed: Jun. 19, 2020

(65) Prior Publication Data

US 2020/0401318 A1 Dec. 24, 2020

Related U.S. Application Data

(60) Provisional application No. 62/864,022, filed on Jun. 20, 2019.

(51) Int. Cl.
*G06F 12/00* (2006.01)
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ........ G06F 3/065; G06F 3/067; G06F 3/0619; G06F 16/24568; G06F 3/061; G06F 3/0649
See application file for complete search history.

(56) References Cited

U.S. PATENT DOCUMENTS

| | | | |
|---|---|---|---|
| 8,161,168 B2 | 4/2012 | Lankford et al. | |
| 10,657,137 B2 | 5/2020 | Slavin et al. | |
| 2018/0121133 A1* | 5/2018 | Bakke | G06F 3/0608 |
| 2018/0288506 A1* | 10/2018 | Muller | H04L 47/722 |
| 2020/0311054 A1* | 10/2020 | Hicks | G06F 16/1805 |

* cited by examiner

*Primary Examiner* — Jason W Blust
(74) *Attorney, Agent, or Firm* — Potomac Law Group, PLLC

(57) ABSTRACT

Embodiments manage a lifecycle of distributed data objects from at least a first data fabric node. Embodiments receive a request from a publisher to anchor a scope. Embodiments anchor the scope to an anchor in the first data fabric node to generate an anchored scope, where the anchor includes a previously published first object and a corresponding first lifecycle and anchoring the scope includes registering interest in the first lifecycle of the anchor. Embodiments publish, by the first data fabric node, scope metadata corresponding to the anchored scope. Embodiments then receive a request from the publisher to publish a second object into the anchored scope to define an anchored object, the anchored object including the first lifecycle.

20 Claims, 10 Drawing Sheets

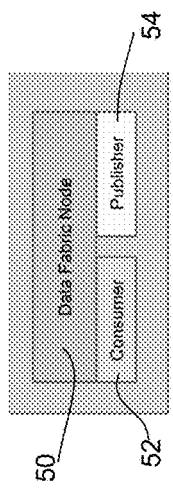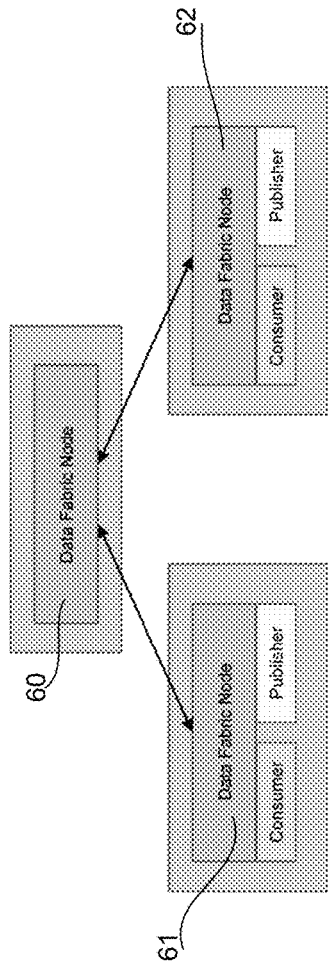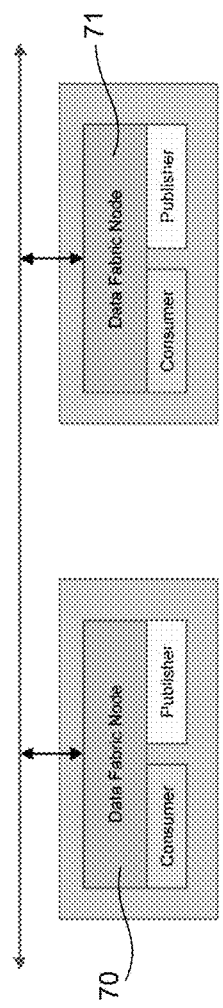

REPLICATED DATA CACHE WITH ANCHORED LIFE-CYCLE

CROSS REFERENCE TO RELATED APPLICATIONS

This application claims priority of U.S. Provisional Patent Application Ser. No. 62/864,022, filed on Jun. 20, 2019, the disclosure of which is hereby incorporated by reference.

FIELD

One embodiment is directed generally to data storage and distribution, and in particular to a data replication and caching system.

BACKGROUND INFORMATION

A distributed data store or system is a computer network where information is stored on more than one node, often in a replicated fashion. A "distributed data store" typically refers to either a distributed database where users store information on a number of nodes, or a computer network in which users store information on a number of peer network nodes. Distributed databases are usually non-relational databases that enable quick access to data over a large number of nodes. Some distributed databases expose rich query abilities while others are limited to a key-value store semantics.

Key-value store solutions offer persistence and/or "refresh" style life-cycle models where Objects must either be explicitly removed or they must be explicitly refreshed to keep them alive and in cache. However, in large-scale distributed business applications that may require tens of thousands of real-time streaming, the large numbers of Objects that must be attended to causes a large computing resource drain.

SUMMARY

Embodiments manage a lifecycle of distributed data objects from at least a first data fabric node. Embodiments receive a request from a publisher to anchor a scope. Embodiments anchor the scope to an anchor in the first data fabric node to generate an anchored scope, where the anchor includes a previously published first object and a corresponding first lifecycle and anchoring the scope includes registering interest in the first lifecycle of the anchor. Embodiments publish, by the first data fabric node, scope metadata corresponding to the anchored scope. Embodiments then receive a request from the publisher to publish a second object into the anchored scope to define an anchored object, the anchored object including the first lifecycle.

BRIEF DESCRIPTION OF THE DRAWINGS

FIGS. 1A-C illustrate data fabrics in accordance to different embodiments.

DETAILED DESCRIPTION

Embodiments are directed to a fault-tolerant and efficient data replication and caching mechanism (referred to as a "data fabric") for storing and replicating Objects in a distributed system for real-time data distribution. The data fabric allows Object-creating business logic (i.e., a "Publisher") to efficiently insert, delete and otherwise manage large numbers of Objects that can be "pushed" to consumers and represent real-time data. The use of the data fabric for this purpose allows Object-consuming business logic (i.e., a "Consumer") to access those Objects in a distributed system architecture spanning an arbitrary number of computer systems and networks.

In embodiments, a Publisher is an application business logic that uses the data fabric to publish Objects in various Scopes for use by one or more Consumers, while a Consumer is application business logic that uses the data fabric to access one or more Objects in various Scopes as published by Publishers.

Embodiments include a data fabric formed from one or more data fabric nodes. The data fabric allows a Publisher to define Object relationships in such a way as to enable autonomous, efficient and distributed Object life-cycle management by the data fabric on behalf of the Publisher—independent of the Publisher life-cycle. The data fabric in embodiments is an abstraction (i.e., the "fabric") describing a mechanism used by business logic to replicate and distributed Objects within a distributed system. The distributed system is a set of cooperating processes running on one or more computers and interacting via a data fabric implementation. For purposes of the disclosure, "business logic" refers to arbitrary application code using the data fabric. With respect to the data fabric, the business logic has one or both roles of "Publisher" and "Consumer". In general, "business logic" cam be considered some arbitrary algorithm or rules driving the actions of the Publisher and Consumer roles.

FIGS. 1A-C illustrate data fabrics in accordance to different embodiments. Each data fabric is a set of one or more data fabric nodes in one or more computer operating system processes. Consumers interact directly with the data fabric node within their process. Data fabric nodes communicate with one another across a network using any variety of inter-process communication mechanisms, such as Remote Procedure Calls ("RPC") or purpose-built asynchronous messaging. In embodiments, the number of Consumers or Publishers associated with any particular Node is arbitrary.

In FIG. 1A, the data fabric includes a single data fabric node 50 that includes a Consumer node 52 and a Publisher node 54 that implement a single-process data fabric deployment. In FIG. 1B, the data fabric includes data fabric nodes 60-62 that implement a hierarchical multi-process data fabric deployment. In FIG. 1C, the data fabric includes data fabric nodes 70-71 that implement a peer-to-peer multi-process data fabric deployment.

Figure 2:
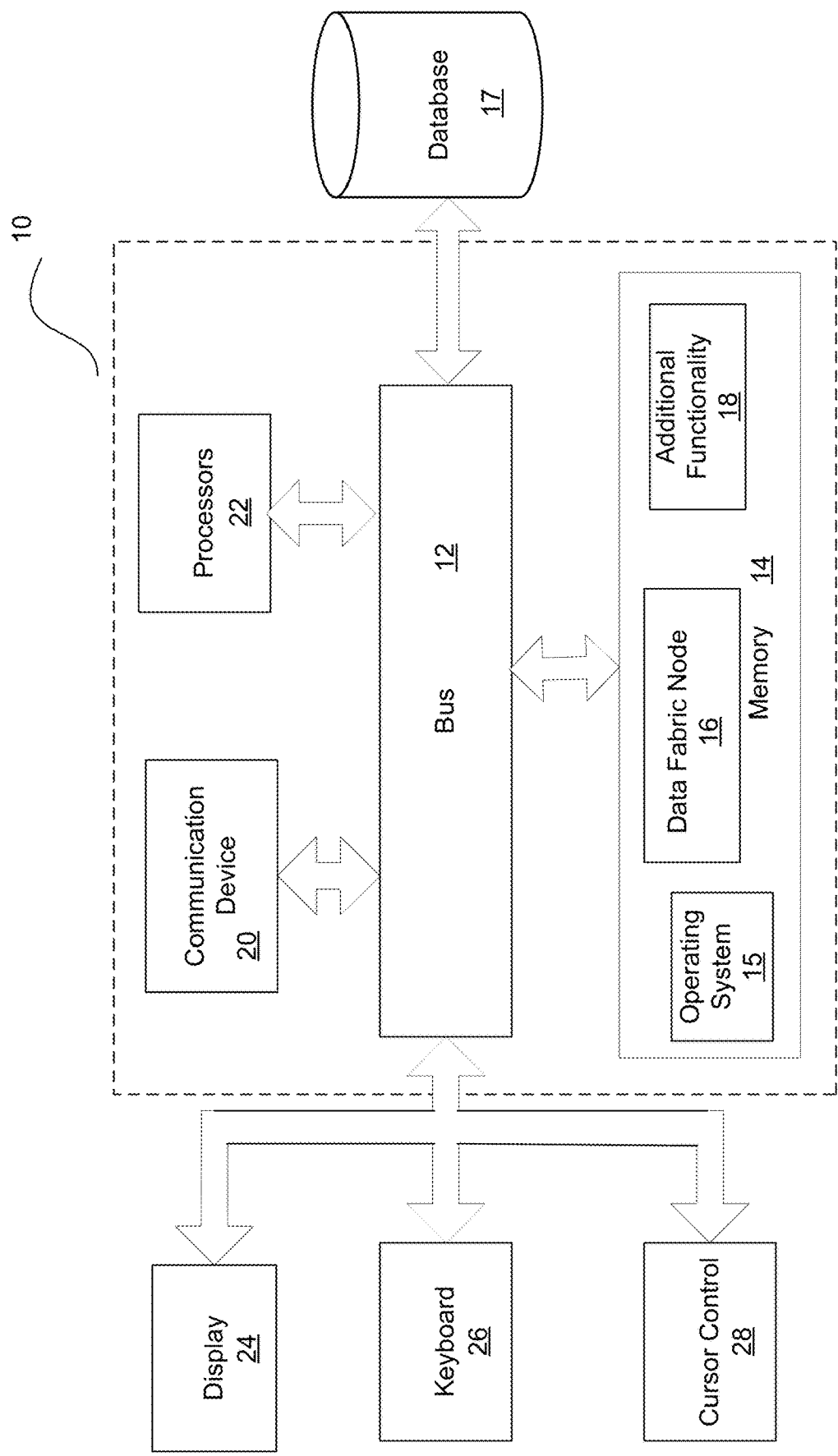
FIG. 2 is a block diagram of a computer server/system that can implement any of the data fabric nodes of FIG. 1 in accordance with embodiments of the present invention.

FIG. 2 is a block diagram of a computer server/system 10 that can implement any of the data fabric nodes of FIG. 1 in accordance with embodiments of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a data fabric node module 16 that implements the functionality of the data fabric node, and all other functionality disclosed herein. System 10 can be part of a larger system. Therefore, system 10 can include one or more additional functional modules 18 to include the additional functionality, such as a financial market real-time data streaming service, or any other service that retrieves and streams a large amount of data, or any other associated business logic. A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In embodiments, a "Type" refers to a unique data Type (e.g., a Class, as in the Java programming language), and an "Object" refers to a named instance of some arbitrary Type (e.g., session metadata). In embodiments, an "Object Scope" refers to a named collection of Objects (a "Scope"), all having the same Type, and an "ID" refers to a globally unique name, or identifier, describing, for example an Object (an "Object ID") or a Scope (a "Scope ID").

Referring again to FIG. 1, each data fabric node is the concrete manifestation of the data fabric abstraction as used by business logic to interact with the data fabric. When created, a data fabric node is implicitly assigned a node ID (i.e., a globally unique identifier). In a distributed implementation of the data fabric, a data fabric node may interact directly and indirectly with zero or more other nodes. A node communicates with other nodes using any one or more of various synchronous or asynchronous message-based protocols and/or RPC mechanisms.

Collectively, the various data fabric nodes and associated business logic using those nodes form the "distributed system." Various system topologies are possible, including but not limited to directed graphs and peer-to-peer networks.

Use Cases

Embodiments provide many use cases that describe functions of the data fabric from the perspective of Publishers and Consumers in accordance to embodiments, including the following:

1. Object Publishing

Object publishing involves a Publisher publishing an Object, making it accessible by Consumers using the same data fabric. Objects published in this manner must be uniquely identifiable. In general, the Publisher passes the Object to the fabric specifying the Object's Type, Scope ID and Object ID. Any Consumer having previously expressed, to the fabric, interest in this particular Scope will receive an event from the fabric indicating that an Object has been added to the Scope. The data fabric will then supply either the Object itself or an exact copy of the Object to the Consumer.

After a Publisher initially publishes an Object, it may subsequently update that Object by replacing in the fabric the existing Object instance with a new Object instance having the same Type, Scope ID and Object ID.

A Publisher removes a previously published Object by specifying to the fabric the Type, Scope ID and Object ID of the Object that should be removed. Any Consumer having previously expressed to the fabric interest in this particular Scope is informed by the fabric that the Object has been removed and provided with a reason for the removal.

A Publisher may publish an Object to the fabric as above and also specify an interval at which the Object (a "Time-Limited Object") must be "refreshed". If the Object is not refreshed in a timely manner by the Publisher or some other business logic, the data fabric automatically removes the original Object along with any replicated copies and notifies any interested Consumers.

A Publisher, or some other business logic, may refresh a Time-Limited Object by passing to the data fabric the identity (Type, Scope ID and Object ID) of the Object that should be refreshed.

A Publisher may want to tie the life-span of Objects in a Scope (the "Anchored Scope") to a particular Object (the "Anchor") outside the Scope. The Publisher requests that the data fabric anchor a Scope by specifying the Type of Objects in the Anchored Scope, the Scope ID of the Anchored Scope, the Type of the Anchor, the Scope ID of the Scope containing the Anchor, and Object ID of the Anchor. Execution of Publisher business logic stops (i.e., blocks) until the Anchor is available or a specified time has elapsed. After a Scope is successfully anchored, any Object published to that Scope will have a lifespan governed by that of the Anchor. The Publisher may want to know if/when the Anchor is removed. However, if the anchor does not exist or come into existence during the requested time-frame, the anchoring request fails.

2. Object Access and Monitoring

In embodiments, object access and monitoring involves when a Consumer wants to access a particular known Object instance of a particular Type. To access an individual Object, a Consumer requests the Object from the data fabric by specifying the Object's Type, the relevant Scope ID, and the Object ID. Execution of Consumer business logic stops (blocks) until the requested Object is available.

When accessing an Object, rather than wait/block indefinitely, a Consumer may choose to block for an arbitrary amount of time before the access operation is considered to have failed. If the Object does not exist or come into existence during the requested time-frame the request fails. Further, when accessing an Object, rather than block or wait, a Consumer may choose to be notified asynchronously when an Object is available.

When accessing an Object, a Consumer can be notified if the Object is subsequently updated or removed. If an Object is removed, the reason for removal can be provided. Reasons for removal include:

Explicit Removal—the Object was removed by the Publisher.
Timeout—the Object had a time-limited lifespan and was not refreshed in a timely manner.
Anchor Removed—the Object was anchored.
Implicit Removal—the Publisher has been disconnected from the data fabric.

3. Scope Access and Monitoring

Scope access and monitoring involves a Consumer wanting to access all the Objects in a particular Scope. To monitor all the Objects in a Scope, using an Object Monitor disclosed below, a Consumer specifies to the data fabric the Object Type and the relevant Scope ID. The Consumer can iterate over the collection of Objects currently in the Scope and can also randomly access Objects in the collection using an Object ID. A call-back can be provided when the Consumer wants to be notified if Objects are added to, removed from, or updated within the Scope.

Logical View

The following concepts apply to a logical view of embodiments of the invention:

A "Default Scope ID" is a predefined and well-known Scope ID.

A "Default Scope" is a Scope for a particular Type having the Default Scope ID. There generally is one Default Scope for each type of Object. In general, Applications are usually designed such that Objects of a given Type are either always in the Default Scope or always in one of many possible explicitly named Scopes where the corresponding Scope IDs are determined by some consistent business logic rules. For example, assume there exists a business object Type called "session" that represents user sessions and has a unique session ID. Further, assume there is another business object Type representing "query" such that query instances are always associated with a particular session instance, and therefore associated with a particular session ID. Then, one possible use of the data fabric is to store session objects in the Default Scope and to store the set of query Objects for each session in an Anchored Scope tied to particular session Object. Given this design, Consumers can find all the active sessions by accessing the session Objects in a well-known Scope and, having knowledge of the individual sessions, find all the queries related to each session by accessing the relevant query Scopes as identified by the query Type and session ID.

An "Object Map" is an abstraction representing the set (i.e., the map) of Objects in a particular Scope and providing both random and sequential access. Essentially, an Object Map is a read-only manifestation of a Scope. Consumers access an Object Map from the data fabric by specifying the appropriate Type and Scope ID.

A "Future" is a construct from standard programming languages, such as Java, used in multi-threaded frameworks to access the result of an asynchronous operation. A Future supports both blocking and timed-blocking access patterns in the form of various "get" operations. Timed access operations fail if unsatisfied after a caller-specified time period. Application logic that acquires a Future and accesses it in a non-blocking manner has the option to cancel a Future before it completes.

An "Object Future" is a Future for which the result of the get operations is a specific Object in a particular Scope.

An "Object Map Future" is a Future for which the result of the get operations is an Object Map.

An "Object Monitor" is an abstraction that receives from the data fabric events relating to a specific object instance. Object-related events include Update and Remove events. A Consumer has the option of associating an Object Monitor implementation with an Object Future when it obtains the Future from the data fabric. The Future supplies access to the requested Object. The optional monitor is notified if the Object is updated or removed.

An "Object Map Monitor" is an abstraction that receives from the data fabric events relating to an Object Map. Map-related events include Add, Remove, and Update events. A Consumer has the option of associating an Object Map Monitor implementation with an Object Map Future when it obtains the future from the data fabric. The Future supplies access to the requested Object Map. The Object Monitor is notified when the data fabric adds, removes or updates Objects in the Scope represented by the Object Map.

An "Object Life-Cycle" is a property that defines the rules governing the removal ("Life-Cycle") of an Object from the fabric are determined by the Publisher that creates it. All Objects in a particular Scope have the same Life-Cycle. Life-cycle alternatives are:

Bound—The data fabric will destroy a Bound Object when the process containing the original Publisher of the Object exits or the Node for that process is otherwise destroyed.
Timed—The data fabric destroys timed Objects that have not been "touched" or "refreshed" within an arbitrary Publisher-specified time interval. The Application refreshing a timed Object does not have to be the Publisher that created it. Therefore, it is possible for Objects with a timed life-cycle to survive a process restart.
Anchored—The data fabric destroys anchored Objects when the Object to which the containing Scope (an "Anchored Scope") is destroyed. Anchored Objects therefore have a life-cycle independent of the life-cycle of the Publisher. An Anchor may itself be in an Anchored Scope and therefore have an Anchored life-cycle—or it could be Bound or Timed.

A "data fabric Node" is the implementation of the data fabric in a particular process (a "Node"). The data fabric abstraction can encompass multiple processes executing on one or more systems.

A "Node Identifier" is an ID used for a Node.

A "Publishing Node" is the Node associated with a particular Publisher.

A "Consuming" or "Consumer" Node is the Node associated with a particular Consumer.

A "Replicating Node" is the Node that replicates an Object originating in some other Node A "Scope Metadata" is a particular Type that describes a Scope in terms of ID, Type, Object Life-Cycle and, for Anchored Scopes, information about the Anchor. Scope Metadata is created by the fabric implementation in response to Publisher activity and is stored in a Default Scope within the fabric. Instances of Scope Metadata can be accessed, monitored, replicated and anchored to—just like any other Object.

A "Default Scope Metadata" is Scope Metadata that exists in a Consuming Node where a Subscriber accesses a Scope before the Scope Metadata from a Publishing Node is available, either because it does not yet exist or the replication of that original Scope Metadata has not yet happened. A Consumer Node will replace (update) any Default Scope Metadata with the actual Scope Metadata if and when that Scope Metadata is available for replication from the Publisher Node (i.e. at some time after the Publisher performs a publish operation).

An "Aggregate Interest" is an abstraction representing the aggregate interest in a particular Object from the perspective of a particular data fabric Node. Aggregate Interest tracks interest from Consumers, both Futures and Monitors, associated with the "local" Node (i.e., "Local Interest") as well as interest from Consumers associated with remote Nodes (i.e., "Remote Interest").

An "Aggregate Object Interest" tracks the Aggregate Interest for a particular Object.

An "Aggregate Map Interest" tracks the Aggregate Interest for a particular Object Map.

A "Distributed Object Future" is an implementation of an Object Future that represents an Object Future in some remote Consuming Node. In other words, a Distributed Object Future is the local manifestation of a get operation in one or more remote Consuming Nodes.

A "Distributed Object Map Future" is an implementation of an Object Map Future that represents an Object Map Future in some remote Node. In other words, a Distributed Object Map Future is the local manifestation of a map access operation in one or more remote Consuming Nodes.

A "Distributed Object Monitor" is an implementation of the Object Monitor abstraction. It is the local manifestation of an Object Monitor in one or more remote Consuming Nodes.

A "Distributed Object Monitor" is an implementation of the Object Map Monitor abstraction. It is the local manifestation of an Object Map Monitor in one or more remote Consuming Nodes.

The Scope, as disclosed above, is a uniquely identifiable collection of Objects. The unique identity of a Scope is formed by an Object Type combined with a Scope ID. The data fabric is conceptually a collection of Scopes. In general, a Scope is effectively an implementation of the Object Map abstraction. A Scope, represented as an Object Map, may be accessed and monitored by one or more Consumers and therefore maintains an Aggregate Map Interest to track that interest.

Interest in a Scope may originate from local or remote Consumers. Local monitoring is represented by Consumer-supplied implementations of the Object Map Monitor. Remote interest in a scope is represented by instances of the Distributed Object Map Monitor.

Objects within a Scope may be individually monitored by one or more Consumers. Therefore, in addition to storing Objects, a Scope also maintains an Aggregate Object Interest for each Object along with any relevant Object Futures and Object Monitors.

Interest in Objects within a Scope may originate from local or remote Consumers. Local monitoring is represented by Consumer-supplied implementations of the Object Monitor. Remote interest in an Object is represented by instances of the Distributed Object Monitor. Each Scope therefore has zero or one Aggregate Map Interests associated with the Scope and zero or more instances of an Aggregate Object Interest, each of which is associated with a unique Object ID within the Scope.

Scope Metadata is a type of Object that describes a particular instance of the Scope. The description includes the Scope ID, the Object Type, and the Object-Lifecycle. The Scope Metadata for an Anchored Scope includes information about the anchor (Scope ID, Object-Type and Object ID).

The data fabric creates Scope Metadata as needed and stores it in the data fabric in the Default Scope ID. As with any other type of Object, Scope Metadata can also be updated or removed. Storing Scope Metadata in the data fabric in this way means that it can be requested and monitored using a Future, Future Callback and Object Map Monitor like any other Scope.

Since a Publisher determines Object Life-Cycle, it is possible that a Scope created in response to Consumer activity will have an undetermined Life-Cycle, at least until an Object is published into that Scope.

At startup, each Node connects to zero or more other Nodes. The set of other Nodes may be configured or dynamically recognized through some advertising mechanism. Subsequently, each Node expresses to any connected Node an interest in the Object Map for the Default Scope of Scope Metadata. It does this by requesting an Object Map Future specifying the Scope Metadata type and the Default Scope Identifier.

Each Node also conveys to the other Nodes any unsatisfied or open-ended interest in specific Objects or Object Maps. Interest expressed from one Node to another is manifested as a Future, as any application-level interest would be. As Objects are replicated from a remote Node into the local Node, any Futures associated with the local Node are satisfied as appropriate.

A Node may detect that a connected Node becomes disconnected, in which case any local replications of Objects that originated with the disconnected Node and having an Object Life-Cycle of type Bound are removed from the Node and any monitoring Futures are notified accordingly. Unlike Bound Scopes, Anchored Scopes are not necessarily dependent in this manner on the existence of the originating Node but rather are dependent on the existence of the Anchor Object.

Use Case Realizations

1. Publishing

Figure 3:
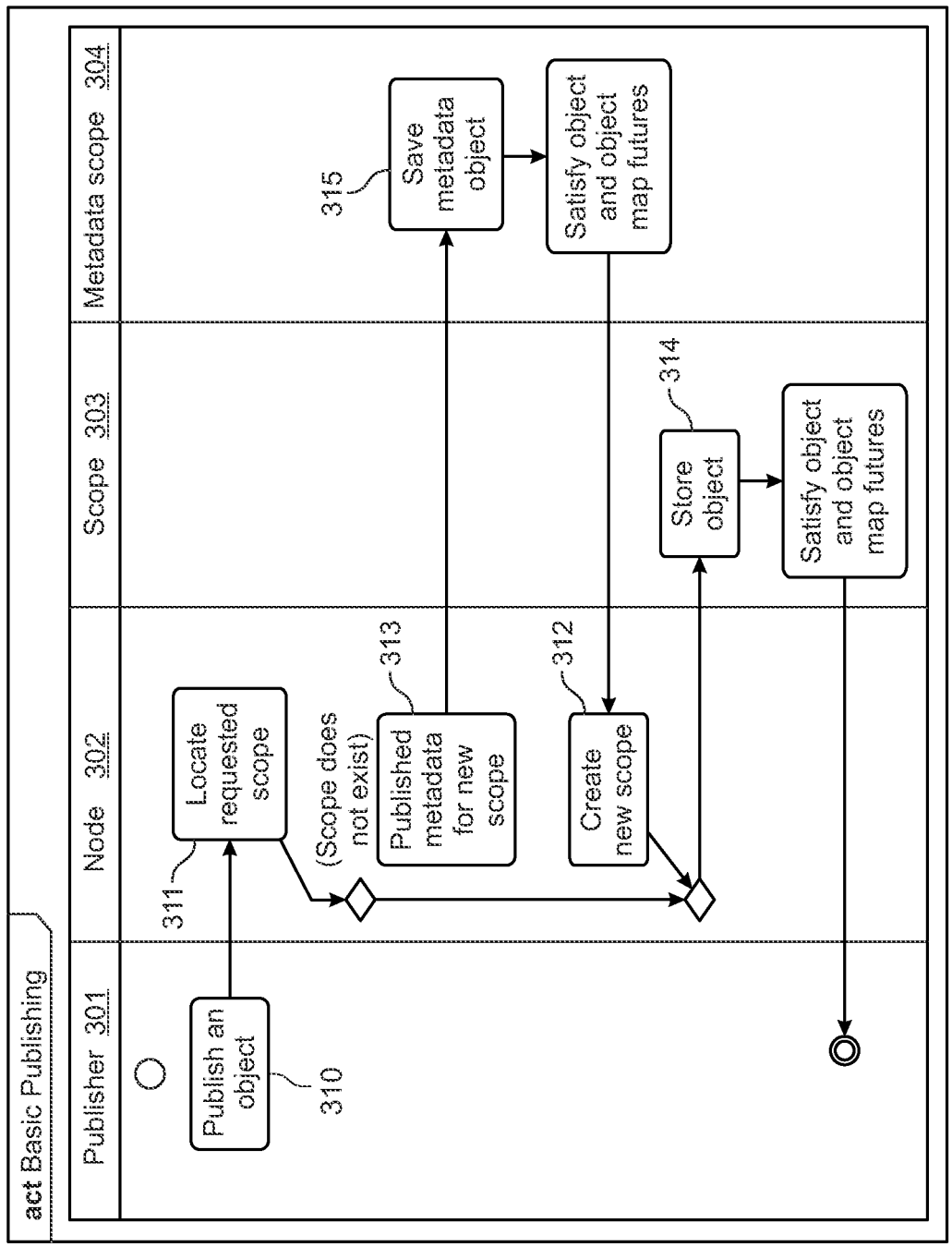
FIG. 3 is a swim lane diagram illustrating functionality for publishing a Bound Object in accordance to embodiments of the invention.

FIG. 3 is a swim lane diagram illustrating functionality for publishing a Bound Object in accordance to embodiments of the invention. In embodiments, the functionality of the swim lane of FIG. 3 (and swim lanes and flow diagrams of FIGS. 4-10 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 310, a Publisher 301 publishes an Object by passing to the data fabric Node 302 the Object Type, the Scope ID, the Object ID and the Object itself.

At 311, Node 302 looks for the specified Scope 303 and, if it does not exist, creates it at 312. All Objects in a given Scope have the same Life-Cycle as determined by the first publishing attempt in a particular Scope.

When Node 302 creates Scope 303, it first creates an instance of Scope Metadata and publishes at 313 in a Default Scope for Scope Metadata 304. Because any connected Nodes have interest in Scope Metadata 304, this new instance of Scope Metadata will be replicated across the data fabric.

Once the appropriate Scope exists, the Object passed by the application is stored in Scope 303 at 314.

If there is an Aggregate Object Interest (comprising both local and remote interest) associated with the published Object, then the Object is passed to the registered Object Futures and/or Object Monitors. In the case of Distributed Object Futures (representing remote interest), the Object must be replicated across a network via one or more intermediate Nodes.

If there is an Aggregate Map Interest for the Scope in which the Object is published, then the new Object is passed to the corresponding Consumers that have expressed interest in the map. Again, those Consumers may be located on local and/or remote Nodes. In all cases the Object would be passed to any Object Map Monitors and would be available for any subsequent random and iterative access via any Object Maps. In the case of Distributed Object Map Futures (representing remote interest), the Object must be replicated across a network via one or more intermediate Nodes.

For publishing timed Objects, a Publisher gives a published Object a Timed Object Life-Cycle by specifying a refresh interval at the time of publishing. The Publisher must periodically "refresh" the Object with the local Node. The local Node will replicate the refresh to any connected Nodes (and so-on throughout the data fabric) thus keeping the Object alive and available.

For any Scopes having a Timed Object Life-Cycle, each Node in a data fabric must track the refresh time of each Object within the Scope and remove any Objects that age (i.e., those whose elapsed refresh time exceeds that specified at the time of publishing).

Figure 4:
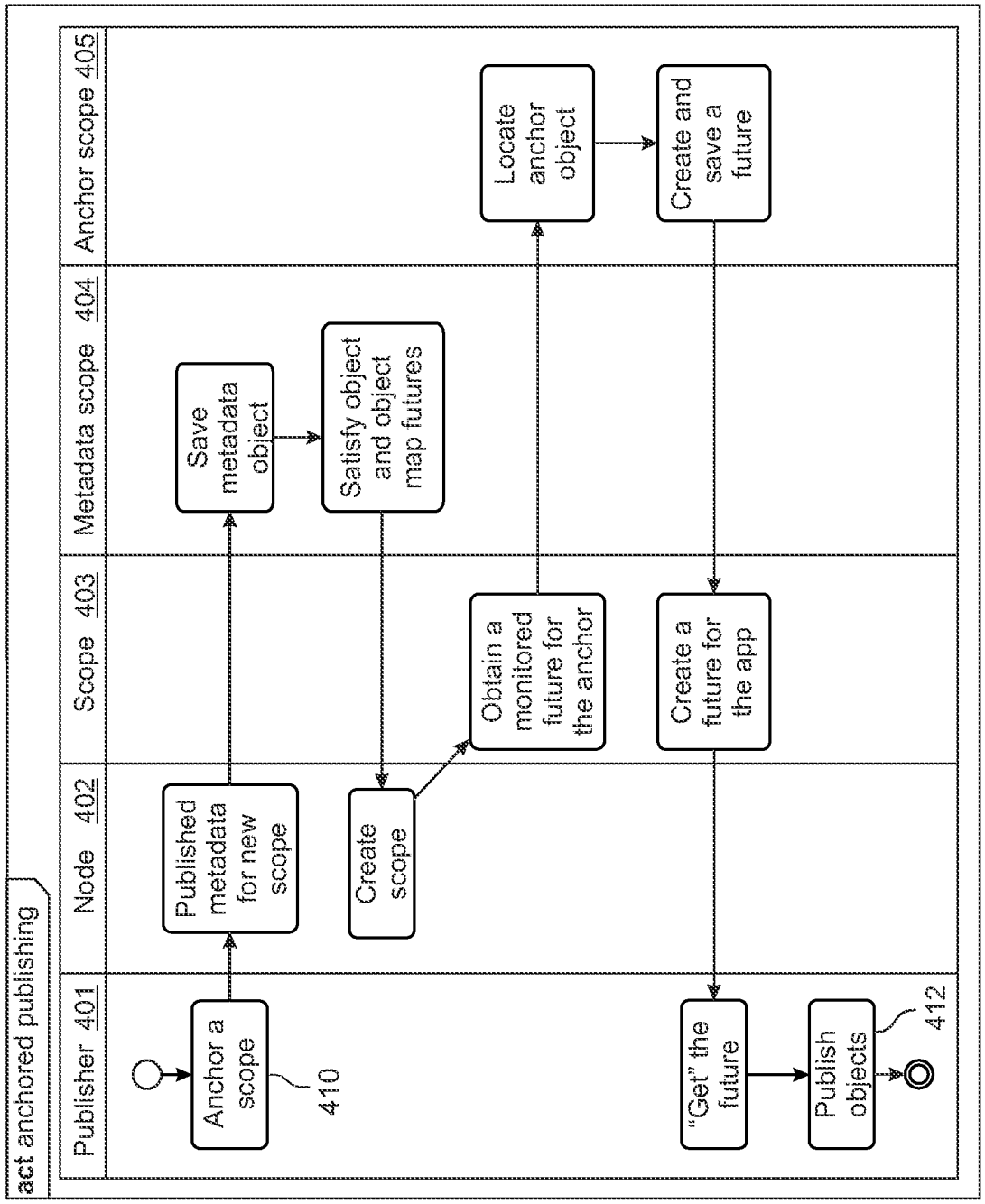
FIG. 4 is a swim lane diagram illustrating functionality for publishing an Anchored Object in accordance to embodiments of the invention.

FIG. 4 is a swim lane diagram illustrating functionality for publishing an Anchored Object in accordance to embodiments of the invention.

At 410, a Publisher 401 anchors a Scope 403 by passing to the data fabric Node 402 the Object Type for the Scope, a Scope Identifier, the Object Type of the Anchor, the Scope Identifier of the Anchor and the Object Identifier of the Anchor. In return, Publisher 401 receives an Object Future for the Anchor. This Future behaves like any other Object Future and Publisher 401 can perform a get operation on the Anchor.

Having obtained the Object Future corresponding to the Anchor, Publisher 401 performs a get operation at 411, typically with a suitable timeout specified. Once the Future is complete, Publisher 401 can publish Objects at 412 into the specified Scope which is now anchored.

In embodiments, anchoring a Scope may fail if the data fabric cannot locate the Anchor in a timely manner. Therefore, the data fabric creates an Anchored Scope 405 with corresponding Scope Metadata 404, including information about the identity of the Anchor. This metadata is inserted into the data fabric as before and is therefore replicated across the data fabric. Other Nodes in the data fabric now understand that this new Scope has an Anchored Lifecycle and, when necessary, will express interest in the Anchor in the form of an Object Future and an Object Monitor.

In a Distributed data fabric, the first time an Object is replicated into an Anchored Scope within a particular Node, that Node will attempt to Anchor the local representation of the Scope and therefore in each such Node in the data fabric, the local representation of a Scope having an Anchored Object Life-Cycle provides an implementation of an Object Monitor associated with the Anchor Future. The implementation of the Object Monitor will respond to an Object delete event (generated if the Anchor is removed from the data fabric for any reason) by removing from the data fabric the Anchored Scope and its contents from that local Node. This life-cycle management activity happens independently in each Node of the data fabric.

A Publisher removes an Object from the data fabric by passing to the Node the Object Type, the Scope Identifier, and the Object Identifier of the Object to be removed. When the Object is removed, the Node locates the relevant Scope and from there can determine if there are any Monitors for this particular Object or for the Scope. As before, interest in an Object may be local and/or remote and the fabric will notify any registered Object Monitors and Object Map Monitors that the Object has been removed. In this case, the reason will be given as an Explicit Removal.

In addition, if the removed Object is an Anchor, meaning there are other Scopes anchored to the removed Objects, the local Node will in turn remove all Objects in those scopes and also remove the Scopes. The reason given is Anchor Removed. Objects removed in this manner may also be Anchors (for one or more other Scopes), and therefore the removal process continues as necessary.

Remote Nodes that had interest in the Object removed by the Publisher will receive a notification, via the corresponding Distributed Object Monitor, that the Object has been removed. A key efficiency improvement in this process is that a Distributed Object Monitor does not forward remove events having a reason of Anchor Removed. Because remote Nodes understand the relationship between Anchors and Anchored Scopes, each Node has the means to manage the removal process autonomously. This minimizes the communication required to remove a tree of anchored Scopes and Objects.

2. Object Accessing and Monitoring

Figure 5:
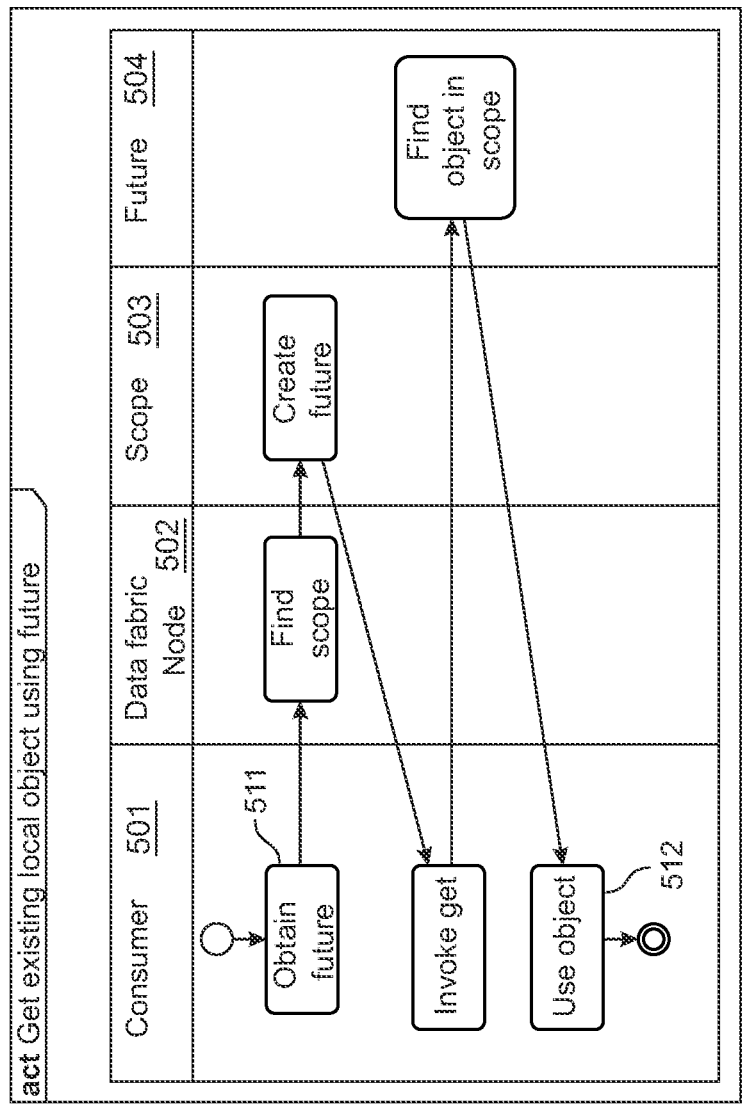
FIG. 5 is a swim lane diagram illustrating functionality for getting an Object with an Object Future in accordance to embodiments of the invention.

FIG. 5 is a swim lane diagram illustrating functionality for getting an Object with an Object Future in accordance to embodiments of the invention.

In FIG. 5, a Consumer 501 accesses an Object by requesting from a data fabric Node 502 an Object Future 504 at 511, specifying to the Node 502 the Object Type, the Scope Identifier and the Object Identifier.

Having obtained the Object Future 504, Consumer 501 can execute a get operation on that Future at 512. There are both blocking and timed-wait versions of the get operation available.

It is possible that Node 502 does not yet have the requested Object and further, it may not have any Scope Metadata for the request Scope. If the Scope Metadata is unknown, Node 502 will create a Scope 503 with Default Scope Metadata. This metadata is a placeholder that will be replaced if and when the metadata from the Publisher Node becomes available.

If there is a Publisher somewhere attached to the data fabric that is publishing to the requested Scope 503, the correct Scope Metadata will be replicated into the local Node and the Default Scope Metadata will be replaced. This has no impact on Consumer 501 but may influence the treatment of the Scope 503 by Node 502 as far as life-cycle management FIG. 6 is a swim lane diagram illustrating functionality for getting a blocking distributed get operation with a single remote node 605 in accordance to embodiments of the invention.

Figure 6:
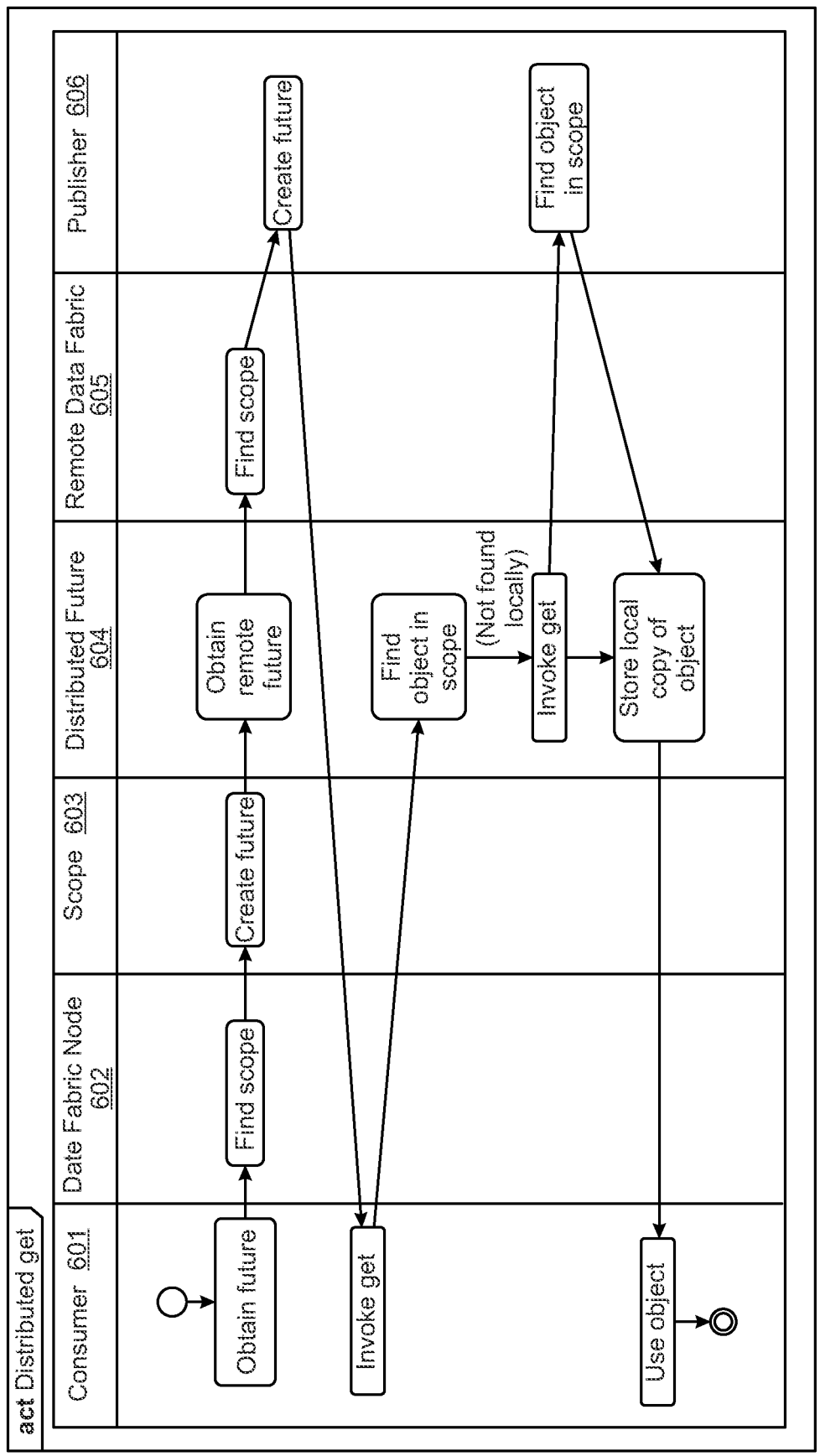
FIG. 6 is a swim lane diagram illustrating functionality for getting a blocking distributed get operation with a single remote node in accordance to embodiments of the invention.

In FIG. 6, if the Object is not available locally, Node 602 will create a Distributed Object Future for each connected Node, 602, 605, thus distributing the get operation across the entire data fabric. Once the Object is found it will be replicated locally and the Object Future will be complete and the Object is available to Consumer 601.

Figure 7:
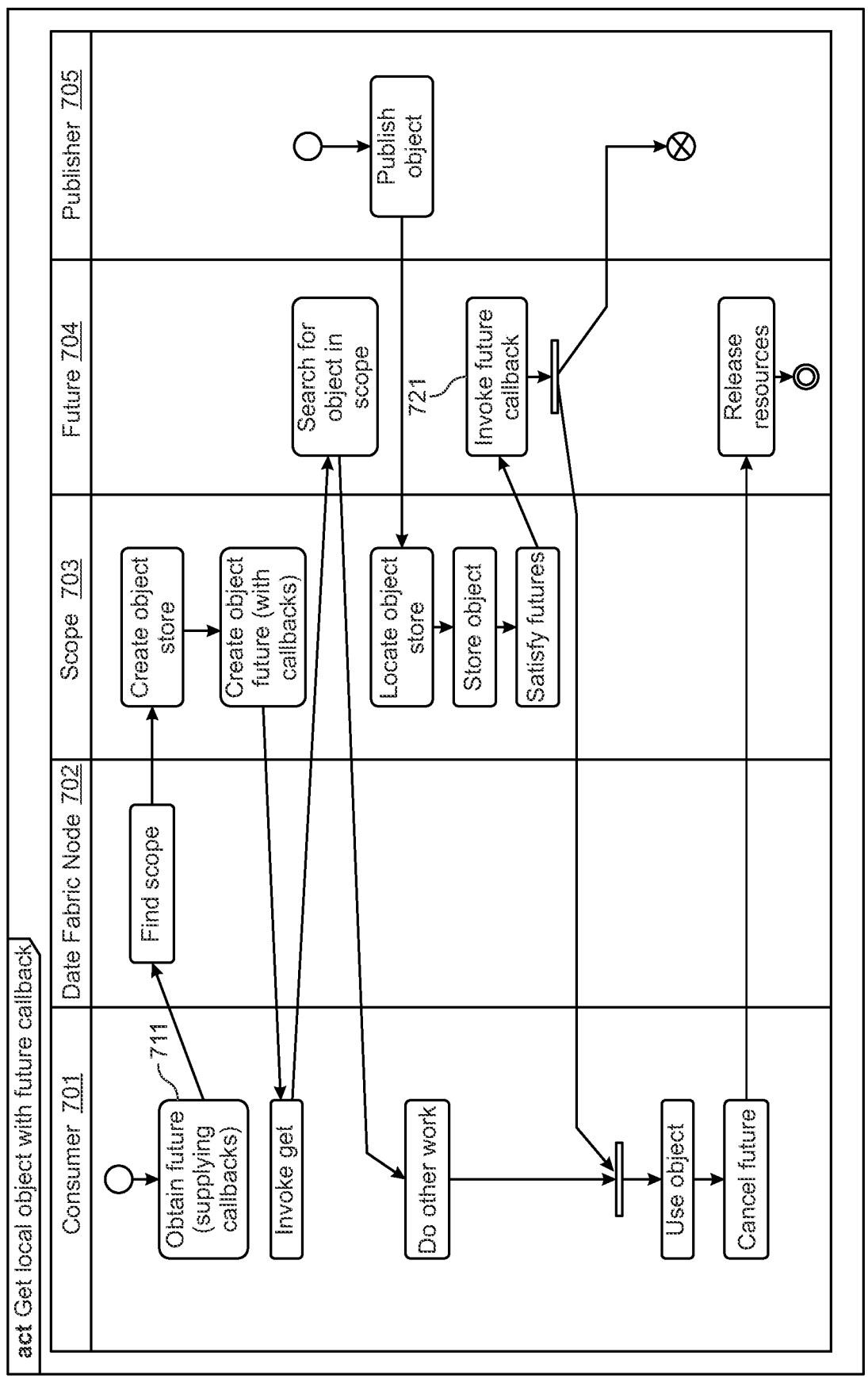
FIG. 7 is a swim lane diagram illustrating functionality for an asynchronous get operation within a single Node in accordance to embodiments of the invention.

FIG. 7 is a swim lane diagram illustrating functionality for an asynchronous get operation within a single Node 702 in accordance to embodiments of the invention.

In FIG. 7, if the Consumer 701 does not wish to block execution while waiting for a Future to complete, Consumer 701 can supply a callback (a "Future Callback") when obtaining the Future 704 at 711. If the Object is available when get is called, get will return the Object. If the Object is not available, the Node 702 will invoke the Future Callback at 721 once the Object has been located.

Since only one Distributed Object Future 704 will actually complete successfully, because there is only one path to the original Object, Node 702 will cancel any other Distributed Object Futures once the Object is found.

If the Object cannot be found and replicated in a timely manner (i.e., within the time-frame Consumer 701 has requested for a blocking get operation), the get operation will fail with a timeout error.

If a Consumer wishes to monitor the state of an Object after a get operation on an Object Future has completed successfully, the Consumer supplies an implementation of the Object Monitor abstraction when requesting the Object Future.

Figure 8:
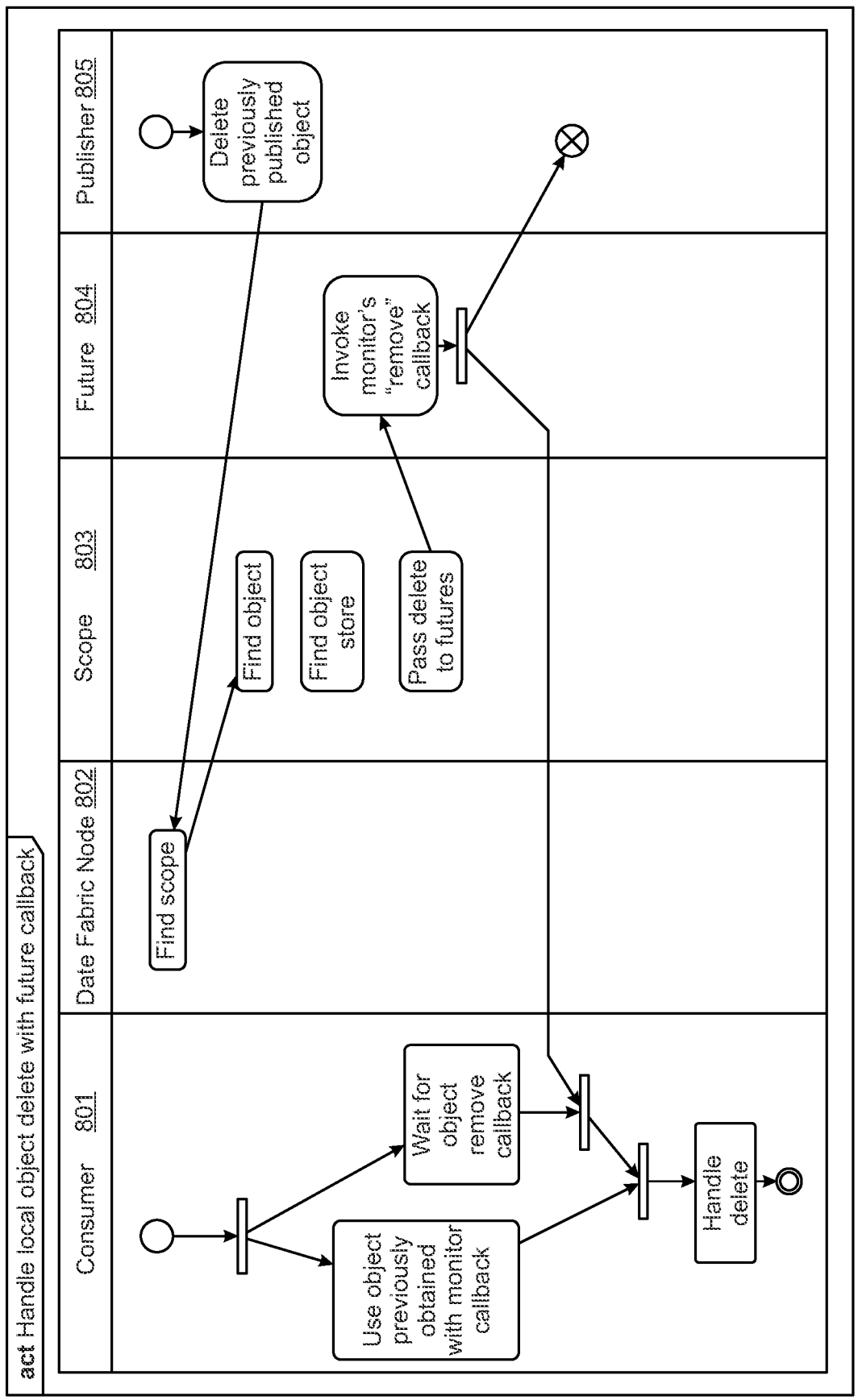
FIG. 8 is a swim lane diagram illustrating functionality of handling a local Object delete Future callback in accordance to embodiments of the invention.

FIG. 8 is a swim lane diagram illustrating functionality of handling a local Object delete Future callback in accordance to embodiments of the invention.

An Object Monitor supplied by a Consumer 801 will be notified if the Object is updated or removed. Canceling an Object Future 804 cancels any requested monitoring as well.

In a scenario where the Object Future 804 relates to a remote Object, the Distributed Object Future(s) created for remote Nodes will request that the remote Node monitors the Object. This triggers the required asynchronous notifications originating in from the remote Node.

If all Object and Object Map Futures for a Scope have been canceled, there is no local interest for that Scope. If there is no local interest in a Scope and the local Node is not the Publishing Node for that Scope, the local Node is free to release any resources for that Scope.

3. Scope Accessing and Monitoring

Figure 9:
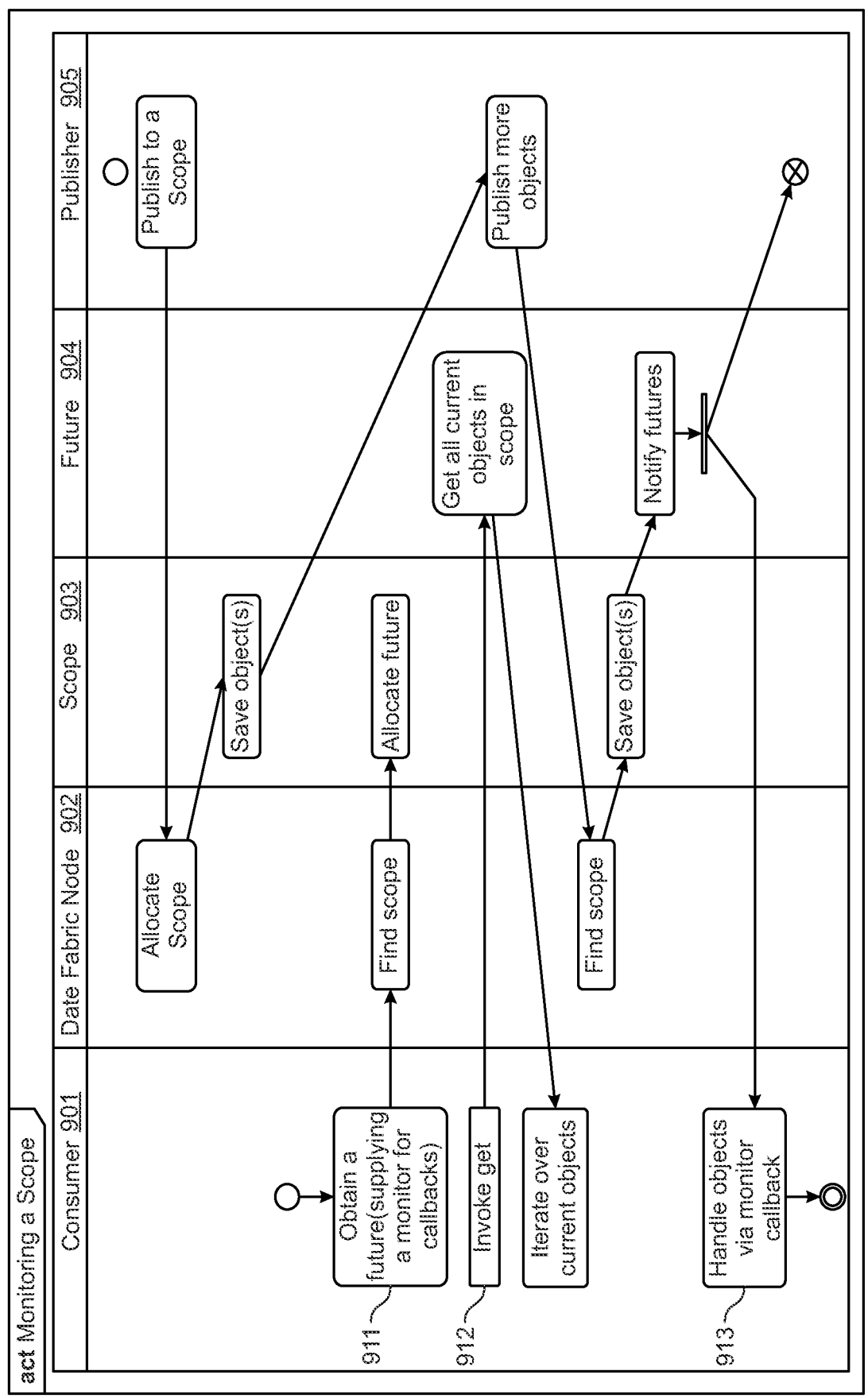
FIG. 9 is a swim lane diagram illustrating functionality of monitoring a Scope in accordance to embodiments of the invention.

FIG. 9 is a swim lane diagram illustrating functionality of monitoring a Scope in accordance to embodiments of the invention.

A Consumer 901 accesses an Object Map by requesting from a data fabric Node 902 an Object Map Future 904, specifying to Node 902 the Object Type and the Scope Identifier. Having obtained Object Map Future 904 at 911, Consumer 901 can execute a get operation on that Future at 912. An Object Map Future always completes successfully because the semantics of a map does not support any concept of completeness with respect to the contents of the map (i.e., a map is complete whether or not it contains any Objects).

Having obtained the Object Map, Consumer 901 can access the contents of the map using iteration or with random access using an Object Identifier.

As in the single Object access use-case, if the Scope Metadata is unknown, Node 902 will create a Scope with Default Scope Metadata. This metadata is a placeholder that will be replaced if and when the metadata from Publisher Node 905 becomes available.

Node 902 will create a Distributed Object Map Future 904 for each connected Node, thus distributing the get operation across the entire data fabric. Any Objects added to the Scope anywhere across the data fabric will be replicated into Consumer Node 90.

If Consumer 901 wishes to monitor the state of an Object Map after a get operation on Object Map Future 904 has completed successfully, Consumer 901 supplies an implementation of the Object Map Monitor abstraction when requesting the Object Map Future. An Object Map Monitor supplied by Consumer 901 at 913 will be notified if Objects are added to the map, removed from the map or updated within the map.

Cancelling an Object Map Future cancels any requested monitoring as well. In embodiments where the Object Future relates to a remote Object, the Distributed Object Future(s) created for remote Nodes will request that the remote Node monitor the Object. This triggers the required asynchronous notifications.

Example Use Case

With embodiments, the use of an anchored life-cycle provides improved resiliency and efficiency derived from the autonomous life-cycle management, as illustrated in the following example use case. Assume there is an large-scale distributed business application that processes queries from client applications in sessions, such that those queries result in tens of thousands of real-time data streams flowing from servers to the client application. For example, a business application that receives a query that then results in streams of real-time stock market data during a session with a client using a web browser.

The by-products of the client session and query analysis are session metadata, query metadata, result metadata and additional metadata regarding the active streams of data and the orchestration required to balance the load of those streams across a cluster of servers. All these types of metadata are expressed in the data fabric as instance of various type of objects. These instances are published into various scopes in a tree-like structure.

For example, the structure might be as follows:
All sessions have a corresponding instance of session metadata type in a Default Scope;
All queries expressed by a given session have a corresponding query metadata instance stored in a Scope with an Scope ID matching the session ID and anchored to the session metadata object;
For each table referenced by the query, there is an query result object that confirms the query result columns describing the contribution of that table to the query result. The query result metadata for each table is stored in a Scope anchored to the query metadata object;

All rows determined by the query analyzer to be in the query results have a corresponding row metadata instance stored in a Scope with a Scope ID matching the query result metadata ID and anchored to the corresponding query result metadata instance;

For each unit of content referenced by the row metadata there is metadata expressing a relationship to a cache location for that content as determined by some kind of orchestration. Each of these instances of cache location metadata is stored in a scope with an ID matching the table-specific query result;

Because of the resource cost associated with maintaining real-time data streams, it is important that a solution releases unused resources in a timely manner.

Collectively, the metadata objects needed in this example would number in the hundreds of thousands or potentially millions, depending on the scale of the query. In a conventional known object replication/caching solution, these objects would have to be either persistent, or refreshed periodically to avoid automatically timing out.

If persistence of the objects is implemented, there would be a significant processing burden to either periodically validate the need for all the required objects and then delete them when necessary or to refresh the objects if using a timeout model. This clean-up activity must be implemented by some application-specific logic that understands the relationship and purpose of all the objects involved.

In contrast and in accordance to embodiments, applying an anchored life-cycle model to the metadata results in an directed graph of anchored scopes such that the session metadata is the anchor for a scope of queries, queries are anchors for scopes of query results, query results are the anchors for scopes of stream metadata, and so on.

With embodiments, it is only necessary to refresh the session metadata. As long as the session metadata remains valid, the associated queries and streams will also be valid and active. Once the client session terminates, the session metadata is either explicitly removed or is removed after a timeout period. Once the session metadata is removed, all the dependent anchored metadata will be recursively removed by the data fabric implementation of embodiments. Because each Node understands the structure of the graph (due to the metadata that drives the anchoring), the removal process happens independently and concurrently in each Node of the data fabric. No application-specific business logic is required to effect the appropriate removal of objects.

Therefore, with embodiments of the invention, since the anchored live-cycle is understood throughout the system, there is no need to propagate the remove operations themselves. Instead, each node in the system can independently execute the removal of anchored objects. This results in significant improvements in terms of processor and network resources. Because all parts of the system understand the anchoring relationship, resilience is improved because nodes in the system can operate independently.

Figure 10:
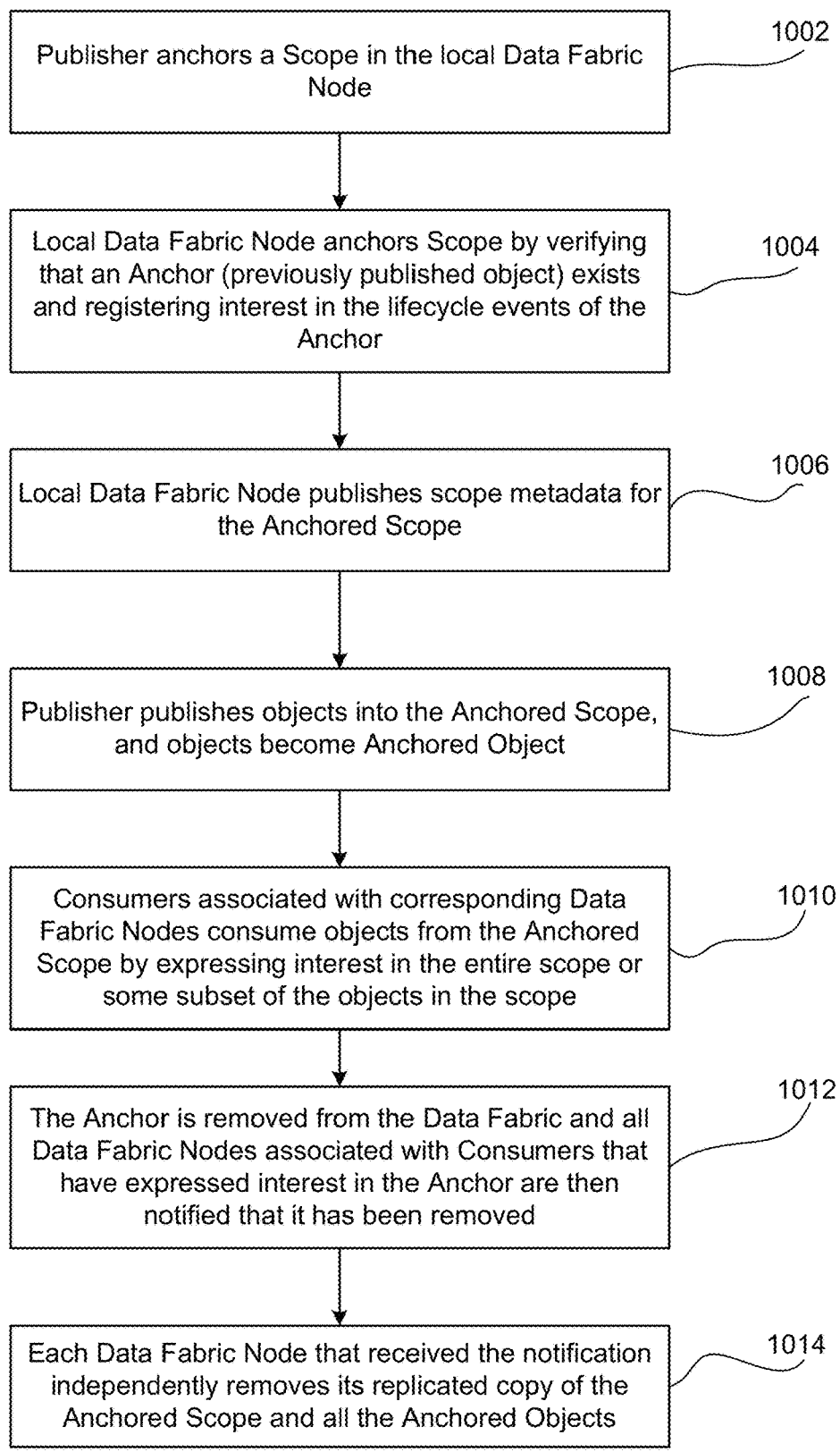
FIG. 10 is a flow diagram of the functionality of the data fabric Node module of FIG. 2 for operating a data fabric with an anchored life-cycle in accordance with one embodiment.

FIG. 10 is a flow diagram of the functionality of data fabric Node module 16 of FIG. 2 for operating a data fabric with an anchored life-cycle in accordance with one embodiment. In general, anchoring is an action performed on a Scope before publishing into that Scope. Anchoring ties the lifecycle of the Scope to some other arbitrary object, referred to as the "Anchor".

At 1002, a Publisher anchors a Scope (the "Anchored Scope") in the local data fabric Node before publishing any objects to that scope. It does this by designating, as determined by Publisher business logic, some arbitrary object, identified by type, scope and identity, as an "anchor". Anchoring is accomplished by the business logic choosing to anchor some arbitrary scope to a previously published object having itself an arbitrary lifecycle. The newly anchored scope now has an anchored lifecycle so that all objects published into the newly anchored scope have an anchored lifecycle, and are then referred to as "Anchored Objects."

At 1004, the Local data fabric Node that receives the anchor request from the Publisher performs the anchoring by verifying that the Anchor (i.e., a previously published object) exists and registering interest in the lifecycle events of the Anchor such that if the Anchor is removed, the Local data fabric Node will be notified using the Distributed Object Monitor disclosed above. Of necessity, the Anchor is in a scope other than the "Anchored Scope" as it must be a published object that already existed prior to anchoring of the dependent scope and therefore must have been already published somewhere into some other scope for the anchoring to succeed.

At 1006, the Local data fabric Node publishes scope metadata for the Anchored Scope that expresses the relationship between the Anchored Scope and the Anchor. If the specified Anchor does not exist, the attempt at anchoring will fail. The relationship between the Anchored Scope and the Anchor is expressed via a generic expression of dependency (i.e., the Distributed Object Monitor). The data fabric itself is uses the Distributed Object Monitor to keep track of the Anchor. Further, in any and all data fabric Nodes where the Anchored Scope has been replicated due to interest by business logic, that data fabric Node will go through the anchoring procedure by locating the Anchor and establishing a monitor.

At 1008, subsequent to successful anchoring, the Publisher publishes arbitrary Objects into the Anchored Scope as driven by Publisher business logic and may also remove those Objects over time. An object published into an Anchored Scope has, by virtue of being contained in that scope, an anchored lifecycle. An object in an Anchored Scope is therefore an "Anchored Object". An Anchored Scope (and implicitly all the objects contained by that scope) are "anchored" to the Anchor. Further, An Anchor (to which one or more Scopes have been anchored) may itself exist in an Anchored Scope and therefore be an Anchored Object. Therefore, its role as an Anchor is independent of its own lifecycle.

At 1010, an arbitrary number of Consumers associated with arbitrary data fabric Nodes consume objects from the Anchored Scope by expressing interest in the entire scope or some subset of the objects in the scope. Regardless of the degree of interest in the Anchored Scope, any data fabric Node where objects from the Anchored Scope are consumed, having determined from the scope metadata that the scope is anchored, also expresses interest in the lifecycle events of Anchor.

At 1012, subsequently, if and when the Anchor is removed from the data fabric, all data fabric Nodes associated with Consumers that have expressed interest in the Anchor are then notified that it has been removed through the use of the Distributed Object Monitor that is in place due to the anchoring.

At 1014, each data fabric Node that received such notification will independently remove its replicated copy of the Anchored Scope and all the Anchored Objects therein, notifying any Consumer of those Anchored Objects that they have been removed.

More than one scope may be anchored to an "anchor". Further, the object to which a scope is anchored may incidentally also be anchored, but only if the scope into which it was published was itself anchored to yet another arbitrary object, and so on.

In embodiments, in the context of anchoring, there are generally at least two different Publishers: a Publisher that publishes an object that arbitrarily may become an anchor, and some other Publisher(s) that anchors a Scope to that object, thus making the object an Anchor. The former is not really involved in anchoring per se.

As an example of the functionality of FIG. 10, and other embodiments, assume there is some business logic that handles session requests. This logic accepts session requests from remote client applications and validates them (e.g., via authentication). Once a session is validated, the session handler, acting as a Publisher, publishes a corresponding session-metadata object to a scope with a time-limited lifecycle (i.e., not anchored). Those session-metadata objects must be refreshed periodically or they will be removed from the data fabric due to a timeout. The session handler ensures that the session-metadata is kept "refreshed" and alive while the remote client session is known to be active.

Subsequently, a client having an active session issues a query in some manner, such that it can be received and interpreted by other business logic that performs query validation. Having validated a query, the query handler, acting as a Publisher, and distinct from the session handling publisher logic, anchors a new scope to the session-metadata corresponding to the session originating the query. Based on its analysis of the query, the query handler publishes into the newly anchored scope an instance of query-metadata. Thus, for each session (session-metadata) there is a distinct scope containing all the query-metadata for any and all queries associated with the session instance.

If the session goes away, either explicitly, such as what would happen in a logout action, or implicitly due a timeout, then the session metadata is removed from the data fabric. Once the session metadata is removed, the anchored query-metadata scope, and all the query-metadata therein, is also removed by virtue of being anchored to the session-metadata In this example, the session handler is a Publisher that publishes session-metadata instances. The query handler anchors the query-metadata scope to a session-metadata instance. That scope is now explicitly an Anchored Scope and the session-metadata is now implicitly an "Anchor". The query handler is a Publisher. It publishes query-metadata objects into the Anchored Scope. All of those query-metadata objects are implicitly Anchored Objects because they are contained in an Anchored Scope.

The session handler knows nothing of the query-metadata scope or query-metadata or the fact that anything has been anchored to the session-metadata(s) it creates. Therefore, while it is a Publisher of objects that will be used as anchors, it knows nothing of anchoring in embodiments.

Known solutions that offer persistence and/or "refresh" style lifecycle models include key-value store solutions. However, these known solutions generally require that the Objects must either be explicitly removed or they must be explicitly refreshed to keep them alive and in cache.

In contrast, embodiments of the invention provided an "anchored" life-cycle model that allows distributed and autonomous lifecycle management that is more efficient from a resource perspective as well as being easier to use from an application development perspective. Embodiments provide for collection of objects (i.e., a scope) to be anchored to another object, so when an object is deleted, everything anchored to that object is also deleted, including other collections of objects. With embodiments, when a session times out in a business logic embodiment, the session object is removed due to the timeout while anchored objects are removed due to the corresponding anchor removal, even though session metadata is kept alive during the session. All nodes in the system have knowledge of the anchored lifecycle. Futures are established that include a callback. Further, embodiments allow the anchoring to monitor when an object or Scope is deleted.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of managing a lifecycle of distributed data objects from at least a first data fabric node, the method comprising:
   receiving a request from a second publisher to anchor a scope;
   anchoring the scope to an anchor in the first data fabric node to generate an anchored scope, wherein the anchor comprises a previously published first object and a corresponding first lifecycle and anchoring the scope comprises registering interest in the first lifecycle of the anchor;
   publishing, by the first data fabric node, scope metadata corresponding to the anchored scope; and
   receiving a request from the second publisher to publish a second object into the anchored scope to define an anchored object, the anchored object comprising the first lifecycle.

2. The method of claim 1, further comprising:
   receiving interest in additional objects from at least one consumer, the interest comprising a first interest in an entirety of the anchored scope, or a second interest in a subset of objects of the anchored scope.

3. The method of claim 2, wherein the consumer is associated with a second data fabric node that is different from the first data fabric node that anchors the scope.

4. The method of claim 3, the second data fabric node anchoring, based on the previously published scope metadata by the first data fabric node, a replica of the anchored scope to the anchor.

5. The method of claim 4, further comprising:
   removing the anchor from the first data fabric node; and
   detecting the removing the anchor at the second data fabric node using an object monitor.

6. The method of claim 5, wherein the second data fabric node creates a replicated copy of the anchored scope, further comprising:
   after detecting the removing, the second data fabric node removing the replica and all corresponding anchored objects and notifying the consumer of the removal.

7. The method of claim 1, further comprising:
   receiving a request from a first publisher, different from the second publisher, to publish the first object; and
   publishing the first object.

8. The method of claim 5, wherein the removing the anchor from the first data fabric node is in response to at least one of: an explicit removal of the anchor by a first publisher that published the anchor, a timeout of the anchor, a removal of a second anchor that corresponds to the anchor, or an implicit removal wherein the first publisher is disconnected from the first data fabric node.

9. A non-transitory computer-readable medium storing instructions that, when executed by one or more processors, cause the processors to manage a lifecycle of distributed data objects from at least a first data fabric node, the managing comprising:
receiving a request from a second publisher to anchor a scope;
anchoring the scope to an anchor in the first data fabric node to generate an anchored scope, wherein the anchor comprises a previously published first object and a corresponding first lifecycle and anchoring the scope comprises registering interest in the first lifecycle of the anchor;
publishing, by the first data fabric node, scope metadata corresponding to the anchored scope; and
receiving a request from the second publisher to publish a second object into the anchored scope to define an anchored object, the anchored object comprising the first lifecycle.

10. The non-transitory computer-readable medium of claim 9, the managing further comprising:
receiving interest in additional objects from at least one consumer, the interest comprising a first interest in an entirety of the anchored scope, or a second interest in a subset of objects of the anchored scope.

11. The non-transitory computer-readable medium of claim 10, wherein the consumer is associated with a second data fabric node that is different from the first data fabric node that anchors the scope.

12. The non-transitory computer-readable medium of claim 11, the second data fabric node anchoring, based on the previously published scope metadata by the first data fabric node, a replica of the anchored scope to the anchor.

13. The non-transitory computer-readable medium of claim 12, the managing further comprising:
removing the anchor from the first data fabric node; and
detecting the removing the anchor at the second data fabric node using an object monitor.

14. The non-transitory computer-readable medium of claim 13, wherein the second data fabric node creates a replicated copy of the anchored scope, the managing further comprising;
after detecting the removing, the second data fabric node removing the replica and all corresponding anchored objects and notifying the consumer of the removal.

15. The non-transitory computer-readable medium of claim 9, the managing further comprising:
receiving a request from a first publisher, different from the second publisher, to publish the first object; and
publishing the first object.

16. The non-transitory computer-readable medium of claim 13, wherein the removing the anchor from the first data fabric node is in response to at least one of: an explicit removal of the anchor by a first publisher that published the anchor, a timeout of the anchor, a removal of a second anchor that corresponds to the anchor, or an implicit removal wherein the first publisher is disconnected from the first data fabric node.

17. A first data fabric node system for managing a lifecycle of distributed data objects comprising:
a processor executing instructions and in communication with publishers and consumers, the processor configured to:
receive a request from a second publisher to anchor a scope;
anchor the scope to an anchor in the first data fabric node to generate an anchored scope, wherein the anchor comprises a previously published first object and a corresponding first lifecycle and anchoring the scope comprises registering interest in the first lifecycle of the anchor;
publish, by the first data fabric node, scope metadata corresponding to the anchored scope; and
receive a request from the second publisher to publish a second object into the anchored scope to define an anchored object, the anchored object comprising the first lifecycle.

18. The first data fabric node system of claim 17, the processor further configured to:
receive interest in additional objects from at least one consumer, the interest comprising a first interest in an entirety of the anchored scope, or a second interest in a subset of objects of the anchored scope.

19. The first data fabric node system of claim 18, wherein the consumer is associated with a second data fabric node that is different from the first data fabric node that anchors the scope.

20. The first data fabric node system of claim 19, the second data fabric node anchoring, based on the previously published scope metadata by the first data fabric node, a replica of the anchored scope to the anchor.

* * * * *